(12) United States Patent
Heijnen et al.

(10) Patent No.: US 7,155,000 B2
(45) Date of Patent: Dec. 26, 2006

(54) PROCESS, ARRANGEMENT, DEVICES FOR SEIZURE OF A SHARED TELEPHONE LINE

(75) Inventors: Henk Heijnen, Liffré (FR); Didier Gayrard, Acigné (FR)

(73) Assignee: Thomson Licensing, Bolounge (FR)

( * ) Notice: Subject to any disclaimer, the term of this patent is extended or adjusted under 35 U.S.C. 154(b) by 55 days.

(21) Appl. No.: 10/490,088

(22) PCT Filed: Sep. 5, 2002

(86) PCT No.: PCT/EP02/10036

§ 371 (c)(1),
(2), (4) Date: Oct. 6, 2004

(87) PCT Pub. No.: WO03/026260

PCT Pub. Date: Mar. 27, 2003

(65) Prior Publication Data

US 2005/0053208 A1     Mar. 10, 2005

(30) Foreign Application Priority Data

Sep. 19, 2001   (FR) .................................. 01 12247

(51) Int. Cl.
*H04M 1/00* (2006.01)
(52) U.S. Cl. .................... 379/161; 379/35; 379/377
(58) Field of Classification Search ............... 379/35, 379/161, 377
See application file for complete search history.

(56) References Cited

U.S. PATENT DOCUMENTS

| | | | | |
|---|---|---|---|---|
| 4,809,317 A | | 2/1989 | Howe et al. | |
| 5,003,581 A | * | 3/1991 | Pittard ..................... | 379/93.09 |
| 5,444,772 A | * | 8/1995 | Coker ........................ | 379/161 |
| 5,796,789 A | * | 8/1998 | Eftechiou .................... | 379/35 |
| 5,978,469 A | * | 11/1999 | Benson ...................... | 379/377 |
| 6,002,747 A | * | 12/1999 | Eftechiou .................... | 379/35 |
| 6,061,438 A | * | 5/2000 | Shen et al. .................. | 379/161 |

FOREIGN PATENT DOCUMENTS

WO     99/63765     12/1999

* cited by examiner

*Primary Examiner*—Jefferey F. Harold
(74) *Attorney, Agent, or Firm*—Joseph J. Laks; Joseph J. Kolodka; Robert B. Levy

(57) ABSTRACT

The invention relates to the control of access of various appliances of an installation which are connected to a telephone line. The appliances have a priority level. There is provision for the dispatching, on the request of an appliance performing a line seizure operation, to the other appliances, of an off-hook signal representative of the priority level of the appliance, when this level is higher than that of at least one other appliance of the installation. The signal is dispatched on the occasion of the line seizure operation and for the duration of the connection of the appliance to the line, if no off-hook signal of a higher priority level is dispatched. There is also provision for a disconnection of the line for any appliance which receives an off-hook signal dispatched for an appliance having a higher priority level.

11 Claims, 2 Drawing Sheets

PROCESS, ARRANGEMENT, DEVICES FOR SEIZURE OF A SHARED TELEPHONE LINE

This application claims the benefit under 35 U.S.C. § 365 of International Application PCT/EP02/10036 filed Sep. 5, 2002, which claims the benefit of French Patent Application No. 0112247, filed Sep. 19, 2001.

The invention relates to a process and an arrangement which are designed to make it possible to control the access of various appliances of a subscriber installation to one and the same line to which these appliances are hooked up in parallel and by way of which there is provision for each of these appliances to be able to communicate in turn, after having successfully performed a line seizure operation. This process and this arrangement are applicable to an installation in which there are provided levels of priority as regards access of the appliances to the line in the installation.

The invention also relates to line/appliance interface devices each provided for controlling the access of an appliance to a shared telephone line within the context of an arrangement such as envisaged hereinabove and for allowing, as a consequence, the implementation of the process according to the invention.

Very diverse appliances are designed to be able to communicate by way of a telephone line and this brings about a considerable increase in the number of private installations where one and the same telephone line is utilized in turn by various appliances which are linked to it. Such shared utilization of one and the same line by several appliances necessitates in practice the devising of a certain number of rules of utilization as the communications established by the various appliances do not necessarily have the same urgency and/or the same importance.

The seizure of a line, by an appliance hooked up to it in an installation, is conventionally performed by detecting the lifting off-hook of the handset of this appliance, when the latter comprises one, or else by another operation aimed at the same purpose, for example the depressing of a particular button of a keypad of the appliance. These operations of line seizure in favour of an appliance commonly give rise to a loop closure action which leads to the establishing of electrical continuity between the wires of the line at the level of an interface through which the appliance connects to the line.

It is sometimes possible for the users of appliances linked to one and the same line in an installation to cooperate so as to avoid utilizing the line simultaneously for different ends by means of different appliances, when this simultaneous utilization is not provided for, and to fix priorities between appliances and/or users. However, such plans do not make it possible to eliminate the risks of untimely engagement of a line by an appliance or of disturbance related to an attempt by one appliance to intervene on a line already utilized by another.

To take these risks into account, certain appliances and in particular those which have an automatic line seizure function, are equipped with individual detectors by way of which certain of the electrical characteristics of a telephone line, to which they are hooked up, can be monitored. Such monitoring and in particular that relating to the line current, voltage and/or echo may founder, insofar as the characteristics monitored at line level may be subject to random variations capable of falsifying the results of the monitoring.

Moreover, cooperation between users, such as envisaged hereinabove, is not always practical, in particular when the appliances are geographically dispersed within the installation, and does not necessarily constitute the desired solution.

There is often provision for a hierarchy as regards access to a line to be established between the appliances of an installation which share the utilization of one and the same telephone line. This is conventionally done in installations having a central unit controlling the linking up of the appliances of the installation to the telephone line or lines. However, such a solution is not directly transposable to installations in which no central unit is provided and in particular to installations where the hooking up of the appliances to a line is performed appliance by appliance, depending on requirements and may evolve along with the installation of new appliances. Now, the reliability as regards access management remains fundamental in these installations.

The invention therefore proposes a process, an arrangement and line/appliance interface devices making it possible to control the access of various appliances of an installation to one and the same line, which serves in the attachment of the installation to a telephone network, the appliances being hooked up to the said line in parallel so as to communicate after having successfully performed a line seizure operation. This process, this arrangement and these devices provide for levels of priority as regards access of the appliances to the line.

According to a characteristic of the process according to the invention, there is provision for:
- the dispatching, on the request of an appliance performing a line seizure operation, to the other appliances of the installation, of an off-hook signal representative of the priority level allocated to the requesting appliance, when this level is higher than that of at least one other appliance of the installation, this signal being dispatched on the occasion of the line seizure operation and for the duration of the connection of the appliance to the line which ensues therefrom, if no other off-hook signal representative of an even higher priority level is dispatched by another appliance of the installation;
- the disconnection of the line or the maintaining of the line in the disconnected state for any appliance of the installation which receives an off-hook signal representative of an appliance allocated a higher priority level than it in the installation.

According to the invention, provision is also made to transmit the off-hook signals of the priority appliances of an installation, by way of the cabling linking the appliances of the installation to the line whose use they share, these signals being dispatched, within the frequency band transmissible by the said cabling and outside the frequency band or bands utilized for the communications of the appliances of the installation with the outside by way of the line.

According to a characteristic of an arrangement according to the invention, a line/appliance interface device is associated with each appliance of an installation for access control purposes, this device being constituted as a function of the priority level allocated to the appliance with which it is associated and whose connection to the line it ensures.

The interface device of an appliance to which the highest priority in an installation has been allocated comprises dispatch means linked to the line so as to be able to dispatch an off-hook signal therein, representative of the highest priority, detection means for monitoring the conduct of the line seizures performed by the appliance from the seizure request up to the end of a communication which ensues therefrom, via the line, and management logic associated with the detection means and with the dispatch means for placing the latter in dispatch mode upon the detection of a line seizure request originating from the associated appliance and for the duration of the communication established as a consequence.

The interface device of a priorityless appliance comprises reception means linked to the line so as to pick up the off-hook signals produced in the installation, switching means which make it possible to connect the appliance to the line, management logic associated with the reception means and with the switching means, so as to control the latter in such a way that the appliance is disconnected from the line as soon as and for as long as an off-hook signal is received.

The line/appliance interface device, provided for an appliance to which an intermediate priority is allocated, comprises:
  reception means linked to the line so as to pick up the off-hook signals produced in the installation,
  switching means which make it possible to connect, disconnect and to keep disconnected from the line the appliance with intermediate priority to which they are assigned,
  dispatch means linked to the line so as to be able to dispatch an off-hook signal therein, representative of the intermediate priority level allocated to the appliance,
  detection means for monitoring the conduct of the line seizures performed by the appliance from the seizure request up to the end of a communication which ensues therefrom, via the line,
  management logic associated, on the one hand, with the reception means and with the switching means, so as to control the latter in such a way that the appliance is disconnected from the line as soon as and for as long as an off-hook signal is received which is representative of another appliance to which a higher priority level is allocated in the installation and, on the other hand, with the detection means and with the dispatch means for placing the latter in dispatch mode upon the detection of a line seizure request originating from the appliance with intermediate priority and for the duration of the communication established as a consequence, via the line, when the switching means ensure the connection of the appliance to this line.

The line/appliance interface devices essentially exhibit the characteristics indicated for them in respect of the arrangement detailed hereinabove.

The invention, its characteristics and its advantages are stated in the description which follows in conjunction with the figures mentioned hereinbelow.

Figure 1:
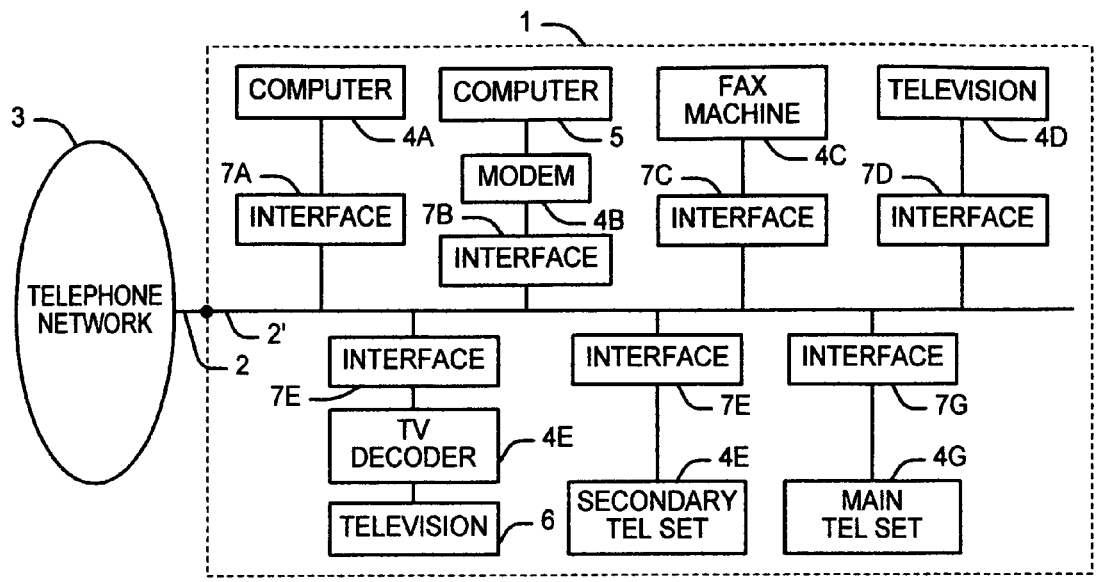
FIG. 1 depicts a schematic diagram of a telephone installation comprising appliances which are hooked up to one and the same telephone line.

The telephone installation 1 depicted by way of example in FIG. 1 is assumed to be served by a telephone line 2 linking the installation to a telephone network 3, for example a public switched network. For this purpose, the installation comprises various appliances, such as 4A, 4B, . . . , 4G, which are able to utilize the line for their communications and which are therefore hooked up to this line 2, for example by linking cabling 2' through which the line is distributed in the installation.

There is provision for each of the appliances to be able to seize the line in turn so as to communicate, it being assumed here, by way of simplification that there is no provision to utilize the line simultaneously for two different communications. As is known, such simultaneous utilization is possible in certain cases, with appropriate hardware, and the process for controlling access to a line, according to the invention, may therefore possibly be applied in respect of these cases.

It is assumed here that provision is made for levels of priority as regards access of the appliances to the line, for example as a function of the nature, of the urgency or of the importance of the communications respectively established by the various appliances. In the example proposed, it is for example considered that an appliance 4A is a computer equipped with an internal modem which allows it to communicate by way of a line 2 with another computer linked by way of the network 3 to another telephone line. The appliance 4B is, for example a modem externally associated with a computer 5 so as to allow the latter to communicate by way of the telephone line 2, as does the computer 4A. The appliance 4C is for example a fax machine which uses the line 2 to communicate with a remote fax machine through the network 3, such an appliance conventionally having automatic line seizure capabilities, for example for calling back a fax machine whose line was engaged at the time of a first call. The appliance 4D is for example a television incorporating a modem by way of which it can be linked to a service provider's equipment, by way of the line 2 and of the network 3 in particular for the purposes of remote payment and control. The appliance 4E is for example a functional housing, such as a TV decoder, incorporating a modem which is associated with a television 6 and by way of which a communication can be established on command or automatically, via the line 2 and the network 3 with a service provider's equipment, such as envisaged hereinabove. The appliances 4F and 4G are for example telephone sets, one secondary and the other main.

According to the invention, there is also provision to associate, with each appliance, a line/appliance interface device, such as 7A, to ensure control of access of the appliance, such as 4A, to a line, such as 2. The assembly of the interface devices associated with the various appliances constitutes an arrangement making it possible to control the access of the appliances to the line while taking account of priority levels respectively assigned to the appliances in an installation, as a function of the requirements and of the desires of the subscriber.

A highest priority level may for example be provided so as to allow an appliance of an installation to seize the line at any moment, whether it be free or already seized by another appliance, by disconnecting the latter, if required. There is then provision for it not to be possible for the seizure performed to be interrupted by another appliance of the installation. A high priority level such as this is allocated for example to a main telephone set, such as symbolized by the appliance 4G in FIG. 1, so as to allow it always to be able to seize the line 2, in particular in case of emergency.

A priorityless level is also envisaged in respect of appliances whose line seizure is permitted only if no appliance having a higher priority level is already on the line and whose keeping on-hold on the line may possibly be interrupted by an appliance whose priority level is higher. A priorityless appliance is for example an appliance having automatic line seizure, such as the television decoder with modem symbolized by the appliance 4E in FIG. 1.

One or more intermediate priority levels are also envisaged in respect of appliances whose line seizure is permitted only if no appliance of equal or higher priority level is on the line and whose keeping on-hold on the line may be interrupted by an appliance to which a higher priority level is allocated. Such an appliance with intermediate priority is for example a secondary telephone set such as 4F, a fax machine, such as 4C, a computer, such as 4A, a modem such as 4B, etc.

According to the invention, the management of these priorities in an installation linked to a telephone line, such as 2, is ensured by the access control arrangement formed by the access control devices which are each associated with an appliance of the installation, such as the line/appliance interface devices 7A to 7G for the appliances 4A to 4G. An installation thus equipped is therefore characterized in that it has an arrangement for controlling access to the telephone line serving it which is constituted by a plurality of decentralized devices.

In the example illustrated in FIG. 1, the devices 7A to 7G are assumed embodied in the form of independent housings designed to be hooked up, on the one hand, to the telephone line 2 and, on the other hand, to an appliance. The hookups to a telephone line in an installation are assumed here to be achieved, in a conventional manner, by way of cabling 2' which extends the telephone line 2 into the installation, so as to allow the various appliances to be hooked up thereto. As is known, the hooking up of the appliances to such cabling is commonly performed by way of plug-in connection means, the cabling terminating in sockets designed to receive plugs to which the appliances are hooked up in parallel. In one embodiment, there is provision for the housings constituting the line/appliance interface devices 7A to 7G to be housings each intended to be plugged into a socket of the cabling and to receive the plug belonging to an appliance. As is known, such a plug may be placed at the end of a cord via which it is linked to the appliance which it serves, it may also be mounted or form part of an appliance. Other forms of embodiment may of course be envisaged, the housings of the devices may, for example, be linked to the cabling sockets by individual cords, in particular if they are integral to the appliances which they serve.

From a practical standpoint, there is also provision for each line/appliance interface device to be able to obtain at least part of the energy required for its operation from the telephone line. However, at least part of the energy required by the device may advantageously be furnished by an ancillary supply. This energy may be furnished by the appliance to which the device is assigned, when such a capability is provided for at the level of this appliance. It may also be furnished by a battery or a cell included in the housing of the device or by hooking the device up to a source or a distribution of energy existing at the level of the installation.

According to the invention, the control of the access of the appliances of an installation to a telephone line, such as 2, provides for a dispatching of an off-hook signal by the line/appliance interface device assigned to an appliance, when this appliance performs a line seizure operation. This dispatch is provided in respect of any appliance which has a priority level higher than that of at least one other appliance of the installation and hence by the appliances to which either the highest priority, or an intermediate priority are allocated, these appliances all having a higher priority than that of the priorityless appliances of the installation.

Such a dispatch is carried out by an appliance when it performs a line seizure operation and for the duration of the connection of this appliance to the line which ensues therefrom, if no other off-hook signal characteristic of an equal or higher level is dispatched on the instigation of another appliance of the installation.

According to the invention, there is joint provision for the disconnection from the line or the holding of the line in the disconnected state for any appliance of the installation which receives an off-hook signal whose characteristic indicates that it has been dispatched by a terminal allocated a priority level higher than it in the installation. Provision may additionally be made for the reception of an off-hook signal characteristic of a specified priority level, which corresponds to that allocated to the appliance receiving it, to prevent the conduct of a seizure operation by the latter, the line then remaining reserved for the benefit of the appliance of the same priority level then connected.

The transmission of the off-hook signals of the priority appliances of an installation is assumed here to be carried out by way of the cabling 2' which links the appliances of the installation to the telephone line 2 whose use they share. These signals are, for example, dispatched within the frequency band transmissible by way of this cabling and for example beyond 200 kHz. They should also be situated outside of the band or bands utilized by the appliances for their communications outside the installation by way of the line 2 and of the telephone network 3. The band used by these signals should preferably be the narrowest possible so as to avoid disturbing any ADSL, VDSL or HPNA mode transmissions which may be made possible by the line 2. Thus, if the line is designed to be utilized in ADSL mode, the band used for the off-hook signals will for example be beyond 140 kHz, this frequency corresponding to the hinge frequency between ADSL upward and downward channels. It is also possible to provide for the use of a frequency slightly higher than the frequency of 1.1 MHz of the highest DMT carrier.

According to an exemplary embodiment, a frequency of 1.2 MHz is provided for the carrier of the off-hook signals, it is modulated differently depending on the priority level which is allocated in the installation to that of the appliances which produces it, when this appliance successfully performs a line seizure operation or when it is connected to the line within the context of a communication. By way of example, a modulation with 1 Hz carrier can be utilized by the terminal or terminals having the highest priority, a modulation with 0.5 Hz carrier can then be utilized for the intermediate priority terminals, it being assumed here that a single intermediate priority level is then envisaged. It is then possible to detect, at the level of the line/appliance interface devices, an attempted simultaneous dispatch by two terminals having different priority levels, on account of the production of a resultant modulation frequency which is higher than the 0.5 Hz modulation.

As indicated above, the access control arrangement according to the invention is constituted by the assembly formed by the line/appliance interface devices which are respectively assigned to the appliances of an installation as a function of the priority levels chosen for the appliances. These various devices make it possible for each to ensure the control of access to the line in respect of the appliance to which they are assigned owing to their interlinking.

Figure 2:
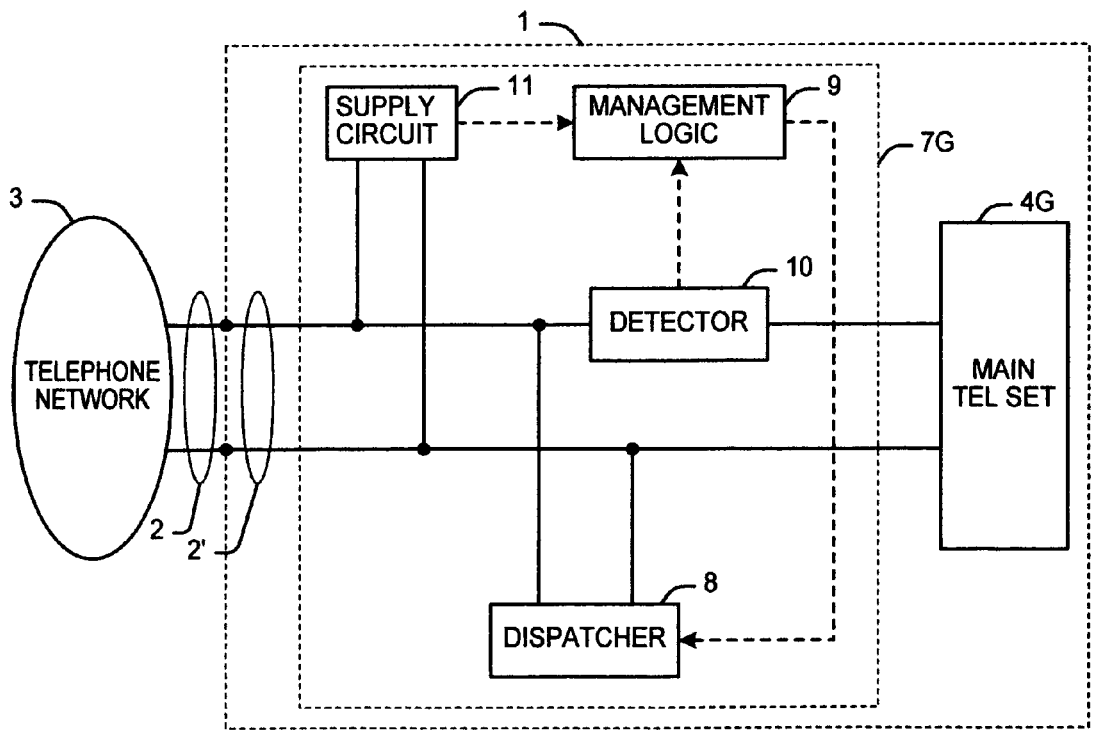
FIG. 2 depicts a schematic diagram of a device for control of access to a telephone line of an appliance allocated the highest priority in an installation wherein are provided priorities as regards access of the appliances to a line.

FIG. 2 depicts a schematic diagram of a device for the control of access to a telephone line of an appliance to which the highest priority in an installation is allocated.

This device corresponds to the device referenced 7G in FIG. 1, it is assumed linked to the wires of the telephone line 2, by way of the cabling 2' of the installation. It is then designed to ensure the hooking up to the line 2 of an appliance, such as 4G, to which the highest priority in the installation is allocated. A dispatcher 8 is provided in the device 7G so as to make it possible to dispatch the above-mentioned off-hook signal to the line/appliance interface devices of the other appliances of the installation, it is therefore linked for this purpose to the wires of the line 2, by way of the wires of the cabling 2' to which this device 7G is hooked up, under the conditions envisaged above. This dispatcher is controlled in dispatch mode by way of management logic 9 as a function of the line seizure requests originating from the appliance 4G, these requests being signalled by way of a detector 10. The detector 10 is, for example, a loop current detector which is inserted onto one of the two wires of the cabling 2' which joins the two wires of the telephone line 2 to the two corresponding wires of the appliance 4G, in such a way as to detect the passage of the current which causes the closure of a line loop contact (not represented) of the appliance. Conventionally this closure occurs upon the lifting off-hook of a handset which this appliance comprises, upon the depressing of a line seizure button which a control keypad of this appliance comprises or on command from control logic of the appliance. It is detected at the end of the line 2 located at the level of the telephone network 3 and allows the appliance to be placed in communication with a remote appliance through the line. A supply circuit 11 is provided at the level of the device, it is shown here hooked up to the line 2 by way of the cabling 2', it being understood that it may also be linked to another source of energy as envisaged above.

Figure 3:
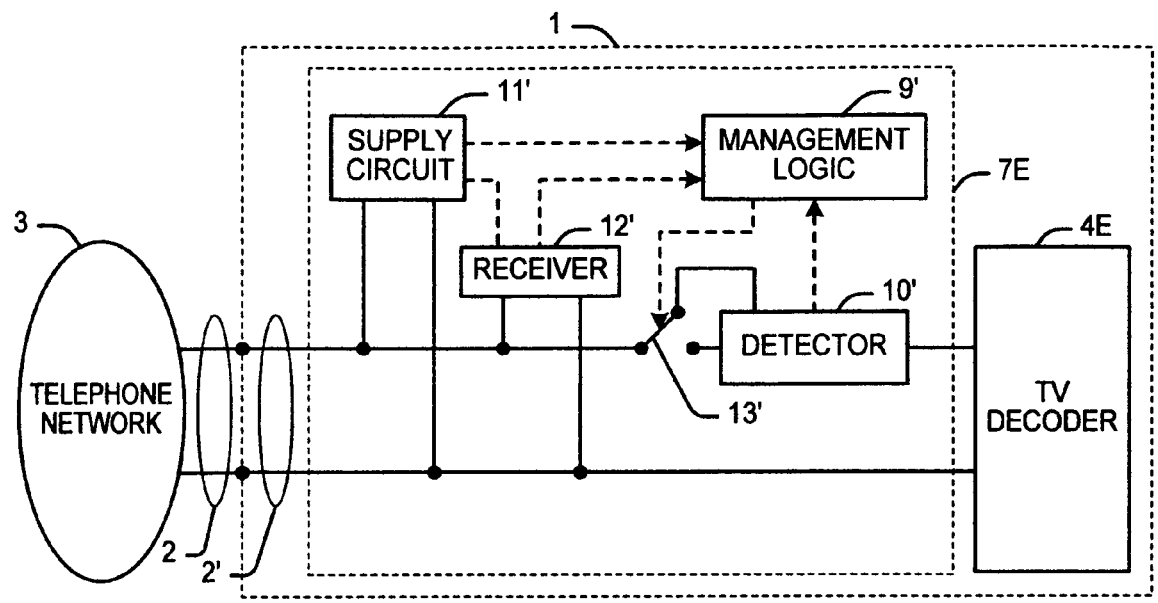
FIGS. 3 and 4 depict schematic diagrams of devices for the control of access to a telephone line of a priorityless appliance and of an appliance allocated an intermediate priority, in an installation such as envisaged in conjunction with the device depicted in FIG. 2.

FIG. 3 depicts a schematic diagram of a device for the control of access to a telephone line of an appliance to which no priority is allocated in an installation.

This line/appliance interface device corresponds to the device referenced 7E in FIG. 1, it is assumed linked to the wires of the telephone line 2, by way of the cabling 2' of the installation. It is designed to ensure the hooking up to the line 2 of a priorityless appliance, such as 4E, in the installation. A detector 10' is provided in the device for detecting the line seizure requests which emanate from the appliance 4E. This detector can be embodied and mounted in the same manner as that provided in a device 7G for high priority appliance. A receiver 12' is provided in the device 7E for picking up the off-hook signals which may be dispatched by appliances which are respectively allocated priorities in the installation, these off-hook signals being assumed as envisaged above. This receiver is therefore linked to the cabling wires 2' by way of which the appliance 4E is hooked up to the wires of the line 2. The picking up of an off-hook signal by the receiver 12' is signalled by the latter to management logic 9' responsible for controlling a switch 13' for disconnecting and keeping disconnected from the line the appliance 4E, for as long as a signal is picked up. This switch is shown here acting at the level of one of the wires linking the line to the appliance.

A supply circuit 11' completes the line/appliance interface device, such as 7E, it is assumed here to be of the same type as that provided for a device 7G.

Figure 4:
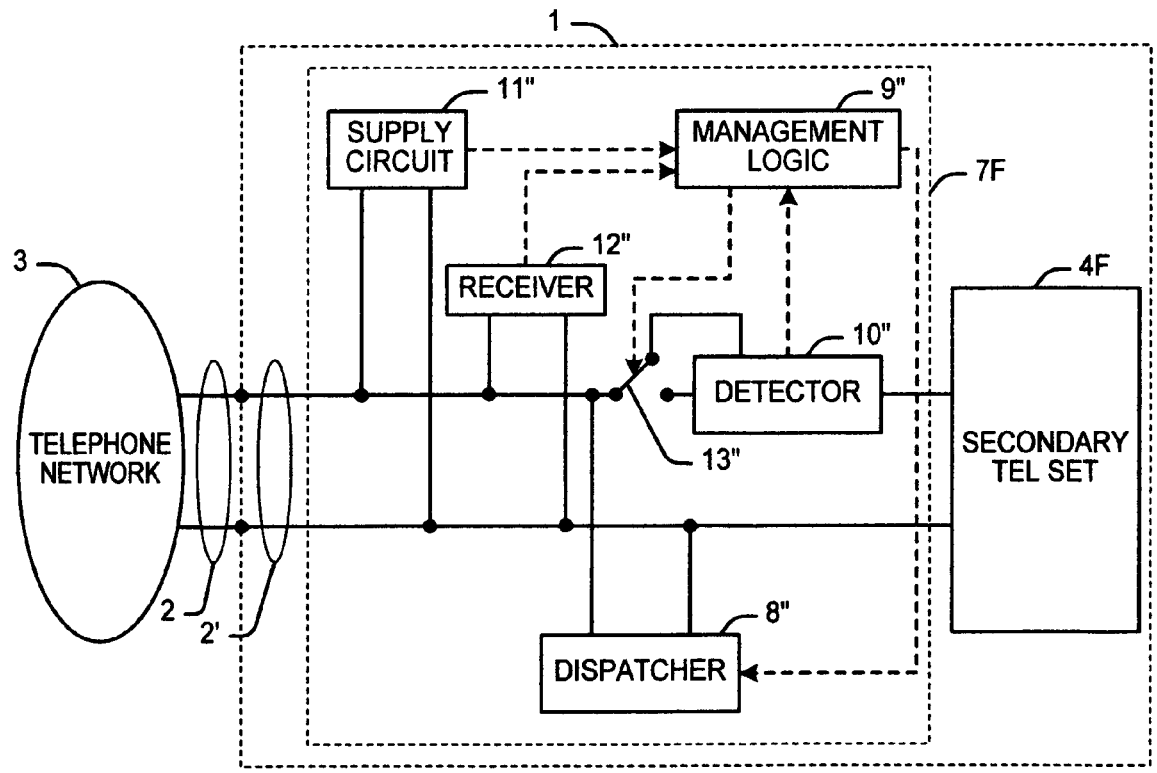

FIG. 4 depicts a schematic diagram of a device for the control of access to a telephone line of an appliance allocated an intermediate priority in an installation.

This line/appliance interface device corresponds to the device referenced 7F in FIG. 1. It is assumed linked to the wires of the telephone line 2, by way of the cabling 2' of the installation so as to ensure the hooking up of an appliance, such as 4F, which is allocated an intermediate priority in the installation.

Such a device 7F associates the various elements which feature in the line/appliance interface devices respectively provided in respect of the priorityless and high priority appliances. It therefore comprises:
  a dispatcher 8" allowing it to dispatch an off-hook signal characteristic of the priority level allocated to the appliance served by the device, i.e. here 4F;
  a detector 10" allowing it to detect the line seizure requests of the appliance 4F;
  a receiver 12" making it possible to pick up, through the cabling 2', the off-hook signals dispatched by the other appliances, having at least the same priority, of the installation;
  management logic 9" which receives:
    on the one hand, a signal characteristic of off-hook signal pick-up and which is delivered by the receiver 12' when the off-hook signal received is characteristic of an appliance having a priority level at least equal and more particularly greater than that allocated to the appliance 4F,
    on the other hand, a line seizure request indication delivered by the detector 10" upon detection of a request emanating from the appliance 4F under conditions which correspond to those described in respect of the appliance 4G;
  a switching facility 13" controlled by the management logic and making it possible to connect and to disconnect the appliance from the line.

The switching facility 13" is preferably designed to maintain the link between the line wire 2 and the corresponding wire of the appliance 4F, as is the switching facility 13' in respect of the appliance 4E, when no off-hook signal is received.

The management logic 9" acts on the switching facility 13" so as to disconnect the appliance 4F, when the latter is communicating and when an off-hook signal characteristic of an appliance having a higher priority level than that allocated to the appliance 4F is received. It is also designed to prevent line seizure by the appliance 4F when an off-hook signal originating from an appliance having the same priority level or a higher priority level is received.

A line/appliance interface device similar to that provided for an appliance allocated an intermediate priority level may be provided for the case where an installation comprises several appliances allocated a higher priority. This device can be constituted in the same manner as a device described in conjunction with FIG. 4. It then comprises management logic which is organized so as to control the switching means of the device in such a way that the high priority appliance to which it is assigned remains disconnected from the line for as long as an off-hook signal whose characteristic indicates that it has been dispatched by an appliance having the same high priority is received. This management logic is also organized so as to control the actuation of the dispatching means of the device upon the detection of a line seizure request originating from the appliance and for the duration of the communication established as a consequence, via the line, when the switching means ensure the connection of the appliance.

The invention claimed is:

1. Process for controlling the access of various appliances of an installation to one and the same telephone line, these appliances being hooked up to the said line in parallel so as to communicate after having successfully performed a line seizure operation, wherein the process provides for levels of priority as regards access of the appliances to the line in the installation, and wherein it comprises a line/appliance interface device associated with each appliance making possible:

the dispatching to the telephone line, on the request of an appliance performing a line seizure operation, to the other appliances of the installation, of an off-hook signal representative of the priority level allocated to the requesting appliance, when this level is higher than that of at least one other appliance of the installation, this signal being dispatched on the occasion of the line seizure operation and for the duration of the connection of the appliance to the line which ensues therefrom, if no other off-hook signal representative of an even higher priority level is dispatched by another appliance of the installation; and the disconnection of the line or the maintaining of the line in the disconnected state for any appliance of the installation which receives from the telephone line an off-hook signal representative of an appliance allocated a higher priority level than it in the installation.

2. Process, according to claim 1, wherein it makes provision to transmit the off-hook signals of the priority appliances of an installation, by way of the cabling linking the appliances of the installation to the line whose use they share, these signals being dispatched, within the frequency band transmissible by the said cabling and outside the frequency band or bands utilized for the communications of the appliances of the installation with the outside by way of the line.

3. Process, according to claim 2, wherein it provides for the transmission of the off-hook signals by way of at least one specified carrier which may be dispatched in conjunction with the various priority appliances and which is modulated differently for each of them as a function of the priority level allocated to it in the installation.

4. Arrangement provided for allowing the control of the access of a plurality of appliances of an installation to the same telephone line, these appliances being hooked up to the said line in parallel so as to communicate after having successfully performed a line seizure operation, wherein the arrangement provides for levels of priority as regards access of the appliances to the line, the said arrangement associating a line/appliance interface device with each appliance of the installation for access control purposes, this device being constituted as a function of the priority level allocated to the appliance with which it is associated and whose connection to the line it ensures, and wherein:

the interface device of an appliance to which the highest priority in an installation has been allocated comprises dispatch means linked to the line so as to be able to dispatch to the telephone line an off-hook signal therein, representative of the highest priority, detection means for monitoring the conduct of the line seizures performed by the appliance from the seizure request up to the end of a communication which ensues therefrom, via the line, and management logic associated with the detection means and with the dispatch means for placing the latter in dispatch mode upon the detection of a line seizure request originating from the associated appliance and for the duration of the communication established as a consequence;

the interface device of a priorityless appliance comprises reception means linked to the line so as to pick up from the telephone line the off-hook signals produced in the installation, switching means which make it possible to connect the appliance to the line, management logic associated with the reception means and with the switching means, so as to control the latter in such a way that the appliance is disconnected from the line as soon as and for as long as an off-hook signal is received.

5. Arrangement provided for allowing the control of the access of a plurality of appliances, according to claim 4, wherein the interface device of an appliance to which the highest priority in an installation has been allocated comprises dispatch means linked to the line so as to be able to dispatch to the telephone line an off-hook signal therein, representative of the highest priority, detection means for monitoring the conduct of the line seizures performed by the appliance from the seizure request up to the end of a communication which ensues therefrom, via the line, and management logic associated with the detection means and with the dispatch means for placing the latter in dispatch mode upon the detection of a line seizure request originating from the associated appliance and for the duration of the communication established as a consequence.

6. Arrangement provided for allowing the control of the access of a plurality of appliances, according to claim 4, wherein the interface device of a priorityless appliance comprises reception means linked to the line so as to pick up from the telephone line the off-hook signals produced in the installation, switching means which make it possible to connect the appliance to the line, management logic associated with the reception means and with the switching means, so as to control the latter in such a way that the appliance is disconnected from the line as soon as and for as long as an off-hook signal is received.

7. Arrangement provided for allowing the control of the access of a plurality of appliances, according to claim 4, wherein the interface device, provided for an appliance to which an intermediate priority is allocated, comprises:

reception means linked to the line so as to pick up the off-hook signals produced in the installation, switching means which make it possible to connect, disconnect and to keep disconnected from the line the appliance with intermediate priority to which they are assigned, dispatch means linked to the line so as to be able to dispatch an off-hook signal therein, representative of the intermediate priority level allocated to the appliance, detection means for monitoring the conduct of the line seizures performed by the appliance from the seizure request up to the end of a communication which ensues therefrom, via the line, management logic associated, on the one hand, with the reception means and with the switching means, so as to control the latter in such a way that the appliance is disconnected from the line as soon as and for as long as an off-hook signal is received which is representative of another appliance to which a higher priority level is allocated in the installation and, on the other hand, with the detection means and with the dispatch means for placing the latter in dispatch mode upon the detection of a line seizure request originating from the appliance with intermediate priority and for the duration of the communication established as a consequence, via the line, when the switching means ensure the connection of the appliance to this line.

8. Device for controlling the access to a telephone line of an appliance with intermediate priority of an installation where several appliances are hooked up to one and the same telephone line by way of which each of them can communicate and where there are provided levels of priority as regards access of the appliances to the line, characterized in that it is constituted in the form of a line/appliance interface module which comprises reception means linked to the line so as to pick up from the telephone line the off-hook signals produced by appliances of the same installation and to which priority levels are allocated, switching means which make it possible to connect, disconnect and to keep disconnected from the line the appliance with intermediate priority to which they are assigned, dispatch means linked to the line so as to be able to dispatch to the line an off-hook signal therein, representative of the intermediate priority level allocated to the appliance, detection means for monitoring the conduct of the line seizures performed by the appliance from the seizure request up to the end of a communication which ensues therefrom, via the line, management logic associated, on the one hand, with the reception means and with the switching means, so as to control the latter in such a way that the appliance is disconnected from the line as soon as and for as long as an off-hook signal is received which is representative of another appliance to which a higher priority level is allocated in the installation and, on the other hand, with the detection means and with the dispatch means for placing the latter in dispatch mode upon the detection of a line seizure request originating from the appliance with intermediate priority and for the duration of the communication established as a consequence, via the line, when the switching means ensure the connection of the appliance to this line.

9. Device for controlling the access to a telephone line of a highest priority appliance of an installation (1) where several appliances are hooked up to one and the same telephone line (2) by way of which each of them can communicate and where there are provided levels of priority as regards access of the appliances to the line, characterized in that constituted as a device for controlling the access of an appliance with intermediate priority, it comprises management logic associated, on the one hand, with the reception means and with the switching means of the device so as to control the latter means in such a way that, on the one hand, the high priority appliance remains disconnected from the line so long as an off-hook signal representative of an appliance having the same high priority is received from the telephone line and, on the other hand, with the detection means and with the dispatch means for placing the latter in dispatch mode upon the detection of a line seizure request originating from the appliance and for the duration of the communication established as a consequence, via the telephone line, when the switching means ensure the connection of the appliance to this line.

10. Device, according to claim 9, wherein it is constituted by a line/appliance interface module, embodied in the form of an independent housing which hooks up to the end of a telephone line and to an appliance, either directly, or indirectly by cable, through means, of plug-in type.

11. Device, according to claim 9, wherein it is constituted by a line/appliance interface module supplied via the line and/or via an ancillary supply included in the housing where the module is contained or hooked up to it.

* * * * *